F. R. BELL.
Plow.

No. 163,352.

Patented May 18, 1875.

WITNESSES:
A. W. Almqvist
A. F. Terry

INVENTOR:
Francis R. Bell
BY Munn & Co
ATTORNEYS.

UNITED STATES PATENT OFFICE.

FRANCIS R. BELL, OF MARSHALL, TEXAS.

IMPROVEMENT IN PLOWS.

Specification forming part of Letters Patent No. 163,352, dated May 18, 1875; application filed April 10, 1875.

*To all whom it may concern:*

Figure 1:
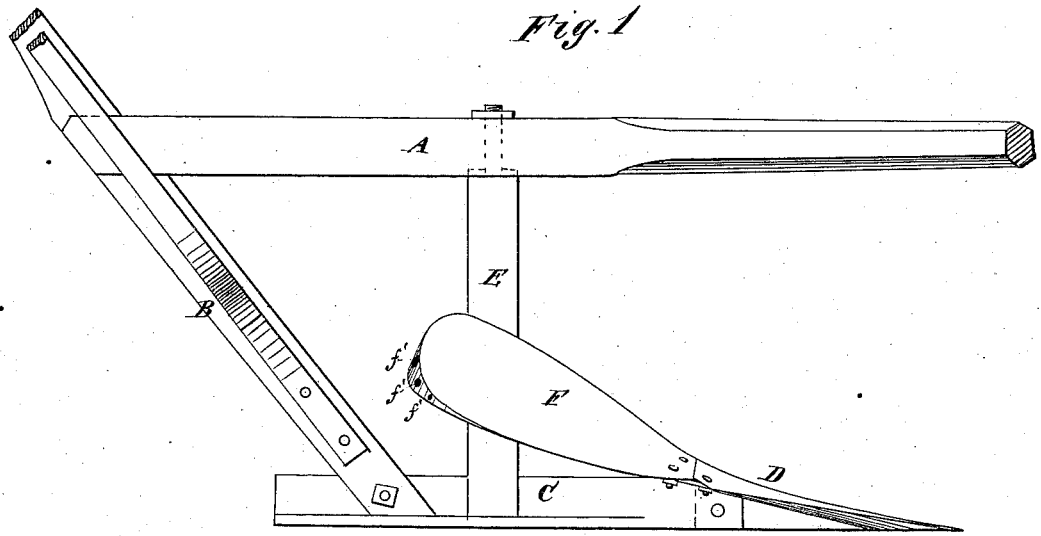
Figure 2:
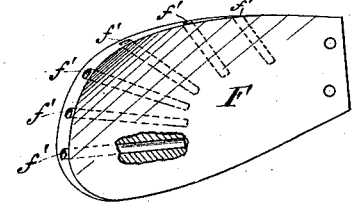

Be it known that I, FRANCIS R. BELL, of Marshall, in the county of Harrison and State of Texas, have invented a new and useful Improvement in Plows, of which the following is a specification:

Figure 1 is a side view of a plow to which my improvement has been applied. Fig. 2 is a plan view of the mold-board, showing in dotted lines the oil-holes, and part being broken away.

Similar letters of reference indicate corresponding parts.

The object of this invention is to furnish plow mold-boards to which the black land of Texas, and other similar soils, will not adhere, so that a furrow can be turned, however sticky and waxy the soil may be.

The invention consists in a wooden mold-board for plows, saturated with oil, and provided with a number of oil-receiving holes or reservoirs in its edges to keep it saturated, as hereinafter fully described.

A is the beam; B are the handles; C is the land-side; D is the point or share, and E is the standard, about the construction of which parts there is nothing new. F is the mold-board, which is made of wood, and of any desired shape, according to the kind of a plow to which it is to be applied. In the edges of the mold-board F are formed a number of holes, $f'$, to receive oil. The mold-board F is designed to be soaked in oil, so as to be fully saturated, and is kept saturated by the oil from the holes $f'$. The outer ends of the holes $f'$ are designed to be closed with plugs or other suitable stoppers. The oiled mold-board will allow the soil to slip over it, however sticky or waxy the soil may be, so that a furrow can be turned properly. When not in use the mold-board F should be kept in oil, so that it may be thoroughly saturated. The board can be made any shape desired, and can be used on all plows now in use—gang and all others of every description.

Having thus described my invention, I claim as new and desire to secure by Letters Patent—

A wooden mold-board, F, for plows, saturated with oil, and provided with a number of oil-receiving holes or reservoirs, $f'$, in its edges to keep it saturated, substantially as herein shown and described.

FRANCIS R. BELL.

Witnesses:
   W. W. HEARTSILL,
   O. H. BELL.